US009408367B2

(12) United States Patent
Alveby (10) Patent No.: US 9,408,367 B2
(45) Date of Patent: Aug. 9, 2016

(54) TEATCUP LINER WITH ENHANCED TEAT MASSAGE

(71) Applicant: DeLaval International AB, Tumba (SE)

(72) Inventor: Nils Alveby, Bandhagen (SE)

(73) Assignee: DELAVAL HOLDING AB, Tumba (SE)

( * ) Notice: Subject to any disclaimer, the term of this patent is extended or adjusted under 35 U.S.C. 154(b) by 209 days.

(21) Appl. No.: 14/064,624

(22) Filed: Oct. 28, 2013

(65) Prior Publication Data

US 2015/0114298 A1    Apr. 30, 2015

(51) Int. Cl.
*A01J 5/08* (2006.01)
*A01J 5/16* (2006.01)

(52) U.S. Cl.
CPC ..... *A01J 5/08* (2013.01); *A01J 5/16* (2013.01)

(58) Field of Classification Search
CPC ................ A01J 5/04; A01J 5/06; A01J 5/08; A01J 5/16
USPC ........................ 119/14.2, 14.49, 14.52, 14.53
See application file for complete search history.

(56) References Cited

U.S. PATENT DOCUMENTS

| 1,220,172 | A |   | 3/1917 | Berthelsen |            |
|-----------|---|---|--------|------------|------------|
| 1,312,941 | A | * | 8/1919 | Anderson   | 119/14.52  |
| 1,365,665 | A | * | 1/1921 | Davies     | 119/14.51  |
| 2,935,964 | A | * | 5/1960 | Pickavance | A01J 5/08  |
|           |   |   |        |            | 119/14.47  |
| 2,997,980 | A | * | 8/1961 | Noorlander | A01J 5/08  |
|           |   |   |        |            | 119/14.49  |
| 4,200,058 | A |   | 4/1980 | Happel     |            |
| 4,530,307 | A |   | 7/1985 | Thompson   |            |
| 5,224,442 | A |   | 7/1993 | Davies     |            |
| 6,164,243 | A |   | 12/2000| Larson     |            |
| 6,631,694 | B1| * | 10/2003| Chowdhury  | A01J 5/08  |
|           |   |   |        |            | 119/14.46  |
| 6,776,120 | B1| * | 8/2004 | Chowdhury  | 119/14.46  |
| 8,113,145 | B2|   | 2/2012 | Sellner    |            |
| 8,567,346 | B1| * | 10/2013| Alveby     | A01J 5/08  |
|           |   |   |        |            | 119/14.49  |

(Continued)

FOREIGN PATENT DOCUMENTS

DE      10152662 A1   4/2003
EP       0105206 A1   4/1984

(Continued)

OTHER PUBLICATIONS

International Search Report, dated Jan. 27, 2015, from the corresponding PCT application.

(Continued)

*Primary Examiner* — Monica Williams
*Assistant Examiner* — Christopher Hutchens
(74) *Attorney, Agent, or Firm* — Young & Thompson (57) ABSTRACT

A teatcup liner, for use in a method of providing enhanced teat massage during a milking operation, includes a cross-sectional shape defining plural corner portions and plural side portions with a first side portion being a weak side and each remaining side portion being a strong side; with the weak side having a greater flexibility than each strong side such that during a collapse phase, the collapse of the weak side occurring first and being greater than the collapse of each strong side creates an asymmetric pressure distribution with a greater pressurized area resulting in a prolonged contact surface against the teat end across a first surface region of the cross-sectional shape opposite the weak side as compared to a remainder of the cross-sectional shape, the increased pressurized area across the first surface region providing an enhanced teat massage during the collapse phase.

22 Claims, 7 Drawing Sheets

(56) References Cited

U.S. PATENT DOCUMENTS

| | | | | |
|---|---|---|---|---|
| 8,627,785 B2* | 1/2014 | Grace | ............... | A01J 5/08 119/14.36 |
| 8,813,681 B2* | 8/2014 | Chowdhury | ............... | A01J 7/00 119/14.46 |
| 2004/0050334 A1* | 3/2004 | Miller | ............... | A01J 5/08 119/14.49 |
| 2011/0126768 A1* | 6/2011 | Grace et al. | ............... | 119/14.47 |
| 2014/0123903 A1* | 5/2014 | Priest | ............... | A01J 5/08 119/14.47 |

FOREIGN PATENT DOCUMENTS

| | | | |
|---|---|---|---|
| EP | 0457993 | A1 | 11/1991 |
| EP | 0 958 738 | A1 | 11/1999 |
| FR | 499 796 | A | 2/1920 |
| FR | 953 779 | A | 12/1946 |
| FR | 1113916 | A | 4/1956 |
| GB | 191010690 | A | 7/1911 |
| RU | 2122785 | | 12/1998 |
| RU | 2122785 | C1 | 12/1998 |
| SU | 1044244 | | 9/1983 |
| SU | 1209115 | | 2/1986 |
| SU | 1639536 | | 4/1991 |
| SU | 1641233 | | 4/1991 |
| WO | 2004000002 | A2 | 12/2003 |
| WO | 2009/042022 | A1 | 4/2009 |
| WO | 2013169186 | A1 | 11/2013 |

OTHER PUBLICATIONS

International Search Report, dated May 5, 2014, from corresponding SE application.

International search report, dated Dec. 18, 2015; Application No. PCT/SE 2014/05164.

* cited by examiner

TEATCUP LINER WITH ENHANCED TEAT MASSAGE

TECHNICAL FIELD OF THE INVENTION

The present invention refers to a teatcup liner configured to be mounted in a shell of a teatcup to be applied to a teat of an animal and a method of providing enhanced teat massage during a collapse phase of a milking operation using the teatcup liner.

BACKGROUND OF THE INVENTION AND PRIOR ART

Teatcup liners having a barrel with various cross-sectional shapes are known. A barrel with a circular cross-sectional shape is common and have an advantage of a fast and complete milking.

U.S. Pat. No. 6,164,243 discloses a teatcup liner comprising a head end portion, a barrel, and an outlet tube. The barrel has a triangular shape with three corner portions and three side portions extending along the length of the barrel. Each of the side portions is curved or bulged outwardly in a rest state.

FR-953,779 discloses another teatcup comprising a shell and a teatcup liner, both having a triangular cross-section with outwardly curved or bulged side portions in a rest state.

Teatcup liners having a barrel with a triangular cross-sectional shape are advantageous in the sense that they are considered to result in a gentle teat treatment during the milking operation. A disadvantage of such triangular or polygonal teatcup liners is, however, that they do not shut off the vacuum completely, resulting in a slower milking.

WO 2009/042022 discloses a teatcup liner having a barrel with a square cross-section.

EP-958 738 discloses a teatcup liner having a barrel with a wave-shape cross-section.

U.S. Pat. No. 8,113,145 discloses a teatcup liner having a barrel with a round cross-section in its upper part portion and a square cross-section in its lower portion to obtain a uniform seal with minimal irritation in the upper portion of a teat and with reduced pressure applied to the lower portion of a teat. In the barrel square portion, one corner-to-corner dimension is greater than the other corner-to-corner dimension to provide different corner radiuses so that the square barrel portion collapses in a roughly diamond shape.

U.S. Pat. No. 6,776,120 discloses teatcup liners of various thickness and with a barrel where at least one of the wall thickness and rib thickness varies as the barrel and the ribs extend axially.

SUMMARY OF THE INVENTION

The object of the present invention is to overcome the problems of prior art teatcup liners and to provide a teatcup liner providing an efficient milking, and securing a gentle treatment of the teat during the milking operation, and in particular providing enhanced teat massage during a collapse phase of the milking operation using the teatcup liner.

This object is achieved by the teatcup liner including a cross-sectional shape defined by at least two corner portions and at least two side portions, where a first of the side portions is a weak side and each remaining side portion is a strong side, where the weak side has a greater flexibility, and accordingly deforms more, as compared to each strong side. Upon the shutoff of the system vacuum at the commencement of the collapse phase of the milking cycle, the greater flexibility of the weak side results in the weak side displacing inwardly first against the teat end (teat tip), before any strong side displaces inwardly, with the inward displacement of the weak side being greater than the corresponding inward displacement of each strong side.

As a result of the timing and displacement of the weak side, as compared to each strong side, an asymmetric pressure distribution is created with a greater pressurized area being realized, against the teat end, specifically across a region of the cross-sectional shape opposite the weak side as compared to the remaining cross-sectional shape. This asymmetric pressure distribution creates an overall increase in pressurized area against the teat end when compared to an otherwise same teatcup liner having side portions of equal flexibility. This asymmetric pressure distribution results in a prolonged contact surface being achieved between the outer surface of the teat end and the adjacent interior surface of the teatcup liner across the region of the cross-sectional shape opposite the weak side.

Prolonged, as used in this specification, means an extended contact surface in both the longitudinal direction and the circumferential direction.

The weak side having a greater flexibility relative to each strong side may be achieve in a number of ways including the wall thickness of the weak side being less than the corresponding wall thickness of each strong side, and/or a length of the weak side being greater than the corresponding length of each strong side.

This increase in the pressurized area, and the resulting prolonged contact surface, is realized across a region of the cross-sectional shape opposite the weak side as compared to the remaining cross-sectional shape, the region being prolonged in the longitudinal direction and/or the circumferential direction. In a triangular embodiment, the increase in pressurized area is achieved in the corner portion opposite the weak side and the adjoining parts of the adjacent two strong side portions. The increase in pressurized area against the teat end includes an increase in pressurized area extending along the longitudinal direction of the barrel in contact with the teat end and resulting in a prolonged contact surface in the longitudinal direction and/or the circumferential direction.

The increase in pressurized area and resulting prolonged contact surface against the teat end increases the force causing the teat canal to close and press blood and lymph back up the teat, relieving congestion and swelling of the teat, thereby providing an improved gentle compressive teat massage during the collapse phase. Improved massage helps maintain the health of the teat and may help avoid teat damage and reduce the risk of the animal developing mastitis. The invention, by improving teat massage avoids excessive congestion and swelling of the teat which may improve complete milkout that would otherwise not be achieved due to the teat becoming congested and swelling during the milking.

Additionally, the teatcup liner according to the present invention permits the teat to contact an upper part of the teatcup liner barrel so as to fill up the inner space of the teatcup liner at the upper part during the whole pulsating cycles of the milking operation and to have a good continuous contact with the interior of the teatcup liner such that no air passages are formed between the vacuum that prevails under the teat end and the interior of the head of the teatcup liner.

Consequently, the teatcup liner of the present invention ensures a proper and efficient milking performance. The present inventor has discovered that the various embodiments of the present invention, improve teat end health and herd and equipment management, including:

faster milking times;
reducing teat end strangulation, i.e., crawl up the end of the teat to the base of the teat closing off annular folds of the udder thereby trapping milk in the udder and pinching off milk flow;
preventing air stream from going into the interior of the head of the teatcup liner because the teat physically comes into contact with the inside surface of the teatcup liner, and fills up an inner space of the teatcup liner free of empty space between the teat end and an interior surface of the head of the teatcup liner during the entire milking operation; and
avoiding the need for vents in the teat cup liner head and barrel, which obviates the need to plug the claw vent in order to reduce air emitted into milking system which in turn may impact vacuum reserve, causes excessive air to be emitted into milking system, hygiene issues relating to the vent becoming clogged/contaminated with interior of the head, turbulence to the milk which may elevate free fatty acid values (reduces butterfat) due to increases milk flow velocity, and turbulence/clogged vent may cause errors in milk meter function which may adversely affect herd management systems, e.g., detaching unit from animal prematurely before milking complete.

In the invention, a wall thickness at least at a center part along the length of the barrel of the weak side is less than a corresponding wall thickness of each remaining strong side. In one embodiment, the wall thickness of the weak side is at least 15% less than the wall thickness of each strong side, as defined by: $((T1\text{-}2)-(T1\text{-}1))/(T1\text{-}2)$ where $(T1\text{-}1)$ is the wall thickness of the weak side, and $(T1\text{-}2)$ is the wall thickness of each strong side.

According to a further embodiment of the invention, a length Lsw of the weak side is greater than the corresponding length Lss of each strong side; and the overall length OLSW of the weak side of the cross-section is also longer than the overlength OLSW of each strong side of the cross-section. Preferably, the length Lsw of the weak side is 15% to 30% greater than the corresponding length Lss of each strong side.

Prior art teatcup liners with, for instance a triangular cross-sectional shape of the barrel approaching a perfect triangle, will have relatively acute corners towards the inner space. However, the teat is not capable of being deformed to such an extent that these corners are filled by the teat, but there will remain an empty space, forming an passage, between the teat end and the interior surface of the head of the teatcup liner during the entire milking and also when the teatcup liner is collapsed.

The present invention addresses this problem by providing the interior surface of the corner portions with a relatively large radius at a center part of the corner portion, especially at least 4 mm. The teatcup liner according to the present invention will thus permit the teat, located at an upper part of the teatcup liner barrel, to fill up the inner space of the teatcup liner during the whole pulsating cycles of the milking operation and to have a good contact with the teatcup liner. According to an embodiment of the invention, the inner radius of each of the corner portions is at least 5 mm at the center part of the corner portion.

In embodiments of the invention, each of the corner portions has a corner wall thickness T2 at least at the center part of the corner portion along the length of the barrel, wherein the wall thickness of the weak side and each strong side is smaller than the corner wall thickness. Such a difference in the wall thickness between the side portions and the corner portion also contribute to a proper collapsing of each of the side portions. Advantageously, the ratio of the wall thickness of each strong side to the corner wall thickness T2 may lie in the range 0.3 to 0.7. Especially, the ratio of the wall thickness of each strong side 24-2 to the corner wall thickness T2 may be 0.5, or approximately 0.5.

Preferably, the wall thickness of the side portions, both the weak side and each strong side, may be 1 to 2.6 mm, and the corner wall thickness of the corner portions may be 2.3 to 6 mm. More preferably, the wall thickness T1-1 of the weak side 24-1 is 1.3±0.5 mm, and the wall thickness T1-2 of each strong side 24-2 is 1.7±0.5 mm.

For the interpretation of the claims, it is to be noted that the rest state may refer to the state when the teatcup liner is not mounted in the shell of the teatcup and thus not subjected to any external forces at all. However, the rest state may also refer to the state when the teatcup liner is mounted in the shell of the teatcup, and not subjected to any further external forces other than from the tensioning resulting from the mounting of the teatcup liner in the shell of the teatcup. In any case, the teatcup liner is not subjected to for instance a milking vacuum or a pulsating vacuum in the rest state, or to the forces or pressures arising when the teat is introduced into the inner space of the teatcup liner.

According to a further embodiment of the invention, each of the side portions is in the rest state curved inwardly towards the central longitudinal axis. Such an inwardly directed curvature or bulging contributes to a controlled collapsing of the teatcup liner, and ensures that all side portions of the barrel of the teatcup liner collapse properly to achieve the desired enhanced massage and avoids formation of air passages. Advantageously, each of the side portions may in the rest state be curved inwardly towards the longitudinal axis along the length of the barrel.

According to a further embodiment of the invention, each side portion comprises an interior surface facing the inner space and having an inner radius extending from a position outside the inner space to the interior surface, wherein the inner radius of each of the side portions is in the rest state at least 20 mm and at the most 100 mm at a center part of the side portion. Advantageously, the inner radius of each of the side portions may in the rest state be at least 30 mm and at the most 50 mm at the center part of the side portion.

According to a further embodiment of the invention, a border line between the corner portion and the side portion is located at an inner transition point, at which a tangent of the interior surface of the corner portion and a tangent of the interior surface of the side portion are parallel and coincide with each other. In such a way a smooth transition between the interior surface of the corner portion and the interior surface of the side portion is ensured.

According to a further embodiment of the invention, each corner portion comprises an outer surface facing away from the inner space and having an outer radius extending from the inner space to the outer surface, wherein each side portion comprises an outer surface facing away from the inner space and having an outer radius extending from a position outside the inner space to the outer surface, and wherein a border line between the corner portion and the side portion is located at an outer transition point, at which a tangent of the outer surface of the corner portion and a tangent of the outer surface of the side portion are parallel and coincide with each other. In such a way a smooth transition between the outer surface of the corner portion and the outer surface of the side portion is ensured.

According to a further embodiment of the invention, the barrel is tapering along the length from the head to the outlet portion. In spite of the tapering of the barrel, the inner radius is within the limits defined above for the center part of the corner portions along the whole length of the barrel.

The invention includes both an oval cross-section shape that defines two corner portions, and two side portions, and a polygonal cross-sectional shape that defines at least three and at the most four corner portions, and thus at least three and at the most four side portions. Embodiments of the invention thus provide a barrel that may have an approximately oval, an approximately triangular, or approximately square cross-sectional shape.

According to a further embodiment of the invention, the teatcup liner also comprises, along the longitudinal axis, a head comprising a lip and an opening for the teat, and an outlet portion, and wherein the barrel extends along the length from the head to the outlet portion.

According to a further embodiment of the invention, the head is an integrated part of the teatcup liner. According to another embodiment of the invention, the head is a separate part attached to the barrel to form the teatcup liner.

According to a further embodiment of the invention, the outlet portion forms a short milk conduit. According to another embodiment of the invention, the outlet portion comprises a nipple configured to permit connection of the outlet portion to a separate short milk conduit.

BRIEF DESCRIPTION OF THE DRAWINGS

The present invention will now be explained more closely by means of a description of various embodiments and with reference to the drawings attached hereto.

DETAILED DESCRIPTION OF VARIOUS EMBODIMENTS OF THE INVENTION

In all embodiments, the teatcup liner includes a cross-sectional shape defined by at least two corner portions and at least two side portions, where a first of the side portions is a weak side and each remaining side portion is a strong side. As discussed below, the teatcup liners are provided with either a polygonal cross-sectional shape or an oval cross-sectional shape.

Figure 3:
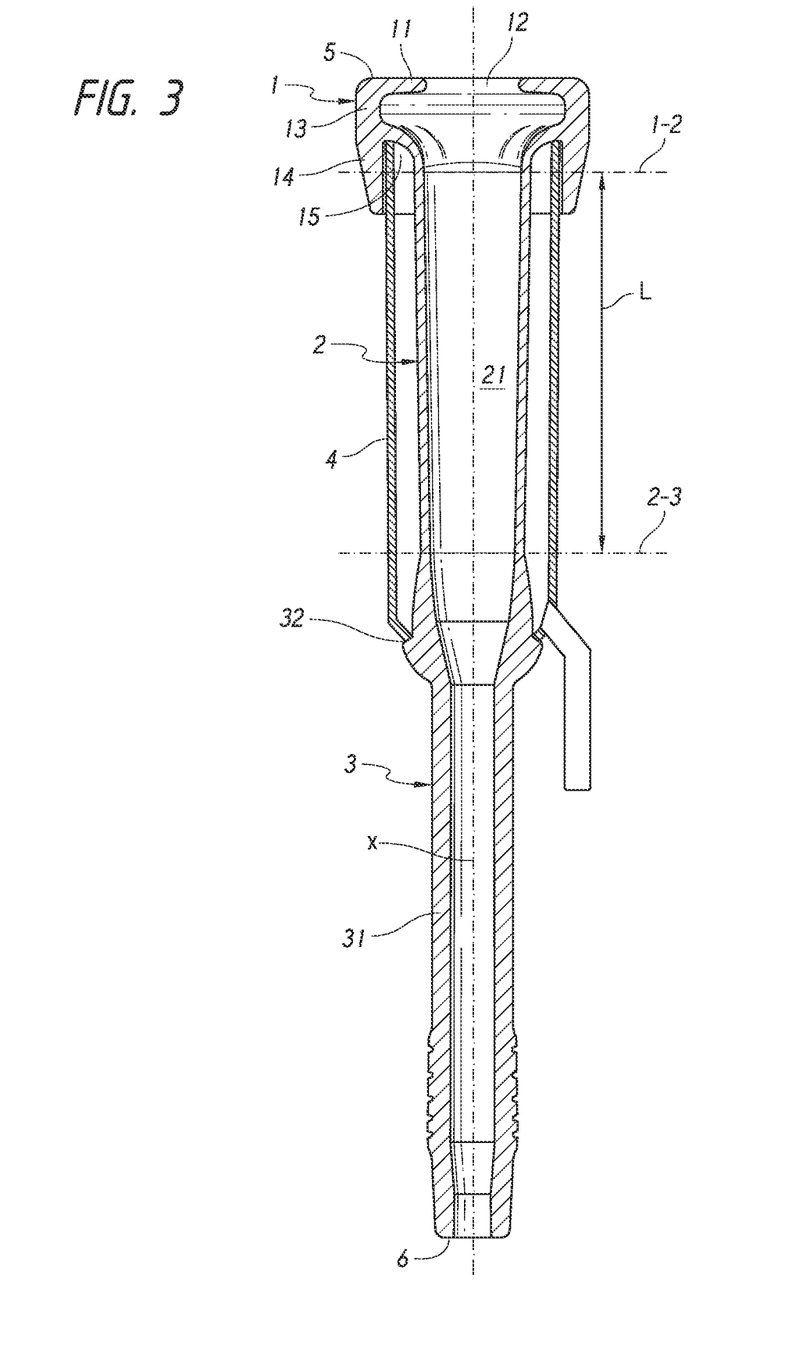
FIG. 3 discloses a longitudinal sectional view of a shell and the teatcup liner in FIG. 1.

In each embodiment, the invention provides a teatcup liner comprising a head 1, a barrel 2, and an outlet portion 3. See, e.g., FIGS. 1 and 2. As can be seen in FIG. 3, in each embodiment, the teatcup liner is configured to be mounted in a shell 4 of a teatcup, i.e., the teacup liner and the shell 4 may form the teatcup, to be applied to a teat of an animal.

The teatcup liner has a longitudinal shape and extends along a longitudinal axis x defining a longitudinal direction. The head 1, the barrel 2 and the outlet portion 3 are provided subsequently after each other along the longitudinal axis x. In the first and second embodiments, the head 1, the barrel 2 and the outlet end 3 are manufactured in one piece of one elastomeric material, such as natural or synthetic rubber, thermoplastic elastomers, etc. or silicon. It is to be noted that the head 1 and/or the outlet portion 3 may be manufactured in another, possibly less elastomeric material than the barrel 2.

The head 1 forms a first end 5 of the teatcup liner. The first end 5 forms an upper end of the teatcup liner to face the udder of the animal during milking.

The head 1 comprises a lip 11 forming an opening 12 for the teat. Furthermore, the head 1 comprises an annular base 13 from which the lip 11 extends towards the longitudinal axis x. The annular base 13 extends from the first end 5 to the barrel 2, i.e., to the border line 1-2.

The head 1 may also comprise a collar 14 which extends from the annular base 13 towards the outlet portion 3, and forms an annular recess 15 for receiving a first end of the shell 4.

The barrel 2 has a length L and defines an inner space 21 for receiving the teat. The barrel 2 extends along the longitudinal axis x from the head 1, i.e. the annular base 13 of the head 1, to the outlet portion 3. The length L of the barrel 2 is significantly larger than the length of the head 1 along the longitudinal axis x.

The barrel 2 is in the embodiments disclosed tapering, or slightly tapering, along the length L from the head 1 to the outlet portion 3. However, it is to be noted that the barrel 2 also may have a cylindrical shape, i.e. without any taper.

The outlet portion 3 thus extends from the barrel 2 to a second end 6 of the teatcup liner. In the first and second embodiment types, the outlet portion 3 comprises a short milk conduit 31 extending to the second end 6 and being configured to be attached to a claw or any other similar milk-receiving member (not disclosed). It is to be noted that the outlet portion 3 may be shorter than disclosed, i.e. the short milk conduit 31 is replaced by an outlet member, such as a nipple or the like, to be attached to a separate short milk conduit.

The outlet portion 3 also comprises means, such as a shoulder 32, a groove or a recess, to engage a second end of the shell 4 when the teatcup liner is mounted in the shell 4 to form the teatcup.

Figures 1, 2:
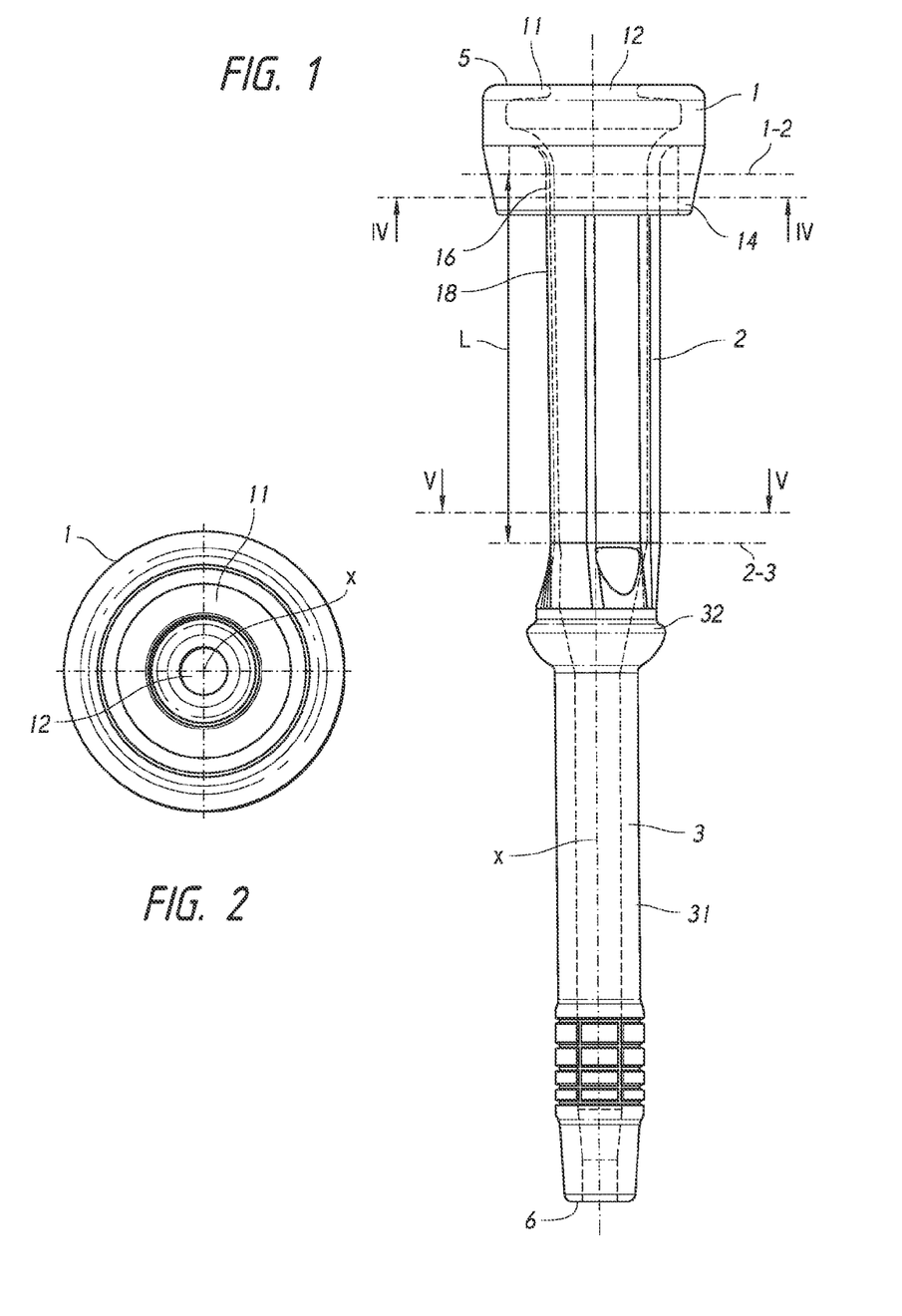
FIG. 1 discloses a longitudinal side view of a first embodiment type of a teatcup liner according to the invention.
FIG. 2 discloses a view from above of the teatcup liner in FIG. 1.

The border between the head 1 and the barrel 2 is indicated by the line 1-2 in FIGS. 1 and 2. The border between the barrel 2 and the outlet portion 3 is indicated by the line 2-3 in FIGS. 1 and 2. The interior circumference of the barrel at the line 1-2 corresponds to a circle with a diameter preferably in the range of 24-26 mm.

The upper part 16 of the barrel 2 begins at the line 1-2 and extends downward to a lower part 18 of the barrel 2. During the milking operation, the teat is sealed against the interior surface at the upper part 16 of the barrel 2, while in the lower part 18 of the barrel 2, the teat end receives the enhanced massage. The transition between the upper and lower parts of the barrel is animal specific. In cows for example, a normal teat is about 50 mm, a short teat is about 30 mm and a long teat is about 70 mm. During the milking operation, the teat will be prolonged about 40%.

The teatcup liner is disclosed in a rest state, or a mounted rest state, in FIG. 2. As mentioned above, the rest state may refer to the state when the teatcup liner is mounted in the shell 4, but not subjected to any further external forces other than from the tensioning resulting from the mounting of the teatcup liner in the shell of the teatcup, i.e. the teatcup liner is not subjected to a milking vacuum or a pulsating vacuum, or to the forces or pressures arising when the teat is introduced into the inner space 21.

Figure 4:
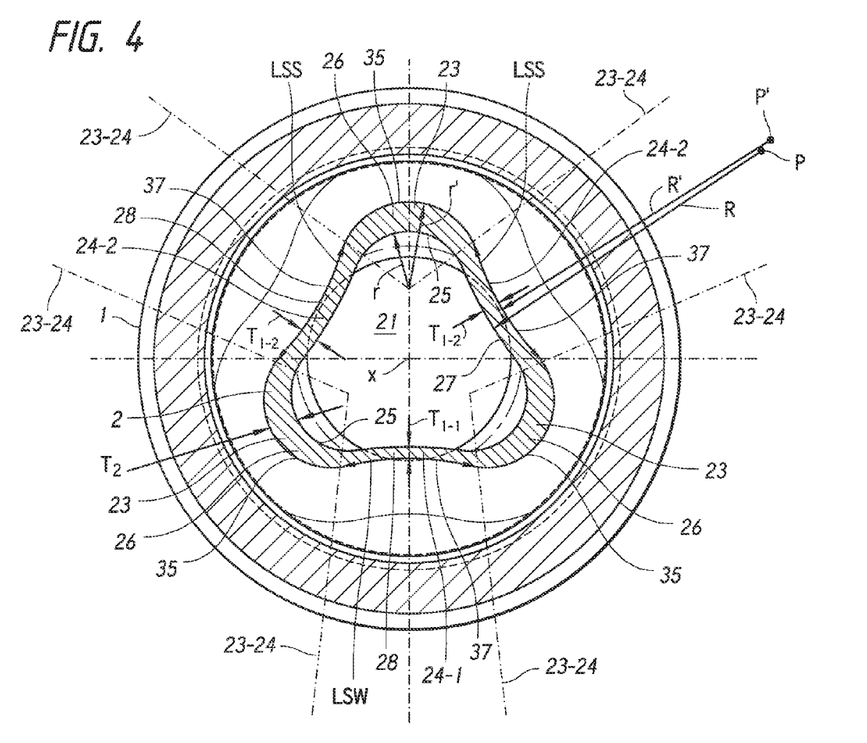
FIG. 4 discloses a sectional view of an upper part of the teatcup liner along the line IV-IV in FIG. 1.
Figure 5:
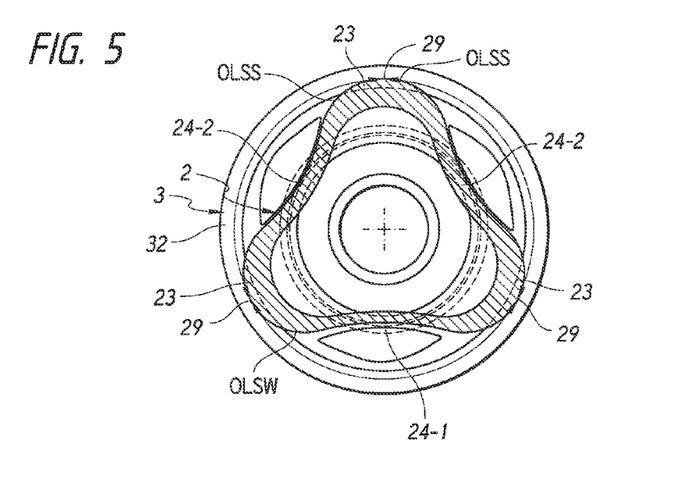
FIG. 5 discloses a sectional view of the teatcup liner along the line V-V in FIG. 1.

As can be seen in FIGS. 4 and 5, in this embodiment type, the barrel 2 has, in the rest state, a polygonal cross-sectional shape with three corners, or a triangular, or an approximately triangular, cross-sectional shape, seen transversely to the longitudinal axis x, preferably along the whole, or substantially the whole, length L from the head 1 to the outlet portion 3. The triangular cross-sectional shape defines three corner portions 23 and three side portions 24-1, 24-2, 24-2, the lower one of which is the weak side 24-1 and the remaining two 24-2 are strong sides. Each side portion connects two of the corner portions 23. The borders between the corner portions 23 and the side portions are indicated by the border lines 23-24 in FIG. 4, i.e., the corner portions 23 and the side portions 24 are separated from each other by a border line 23-24.

In preferred embodiments, each of the corner portions 23 has a wall thickness T2 at least at the center part 26 of the corner portion 23, and measured transversely to the longitudinal axis x, each wall thickness T1-1, T1-2 of the weak side 24-1 and each strong side 24-2 is smaller than the wall thickness T2 of each corner portion 23. Each corner portion 23 comprises an interior surface 25 and having an arcuate concave curvature facing the inner space 21 with an inner radius r extending from the inner space 21 to the interior surface 25.

In preferred embodiments, the inner radius r is equal for each corner portion 23 in the rest state. Moreover, the inner radius r of each of the corner portions 23 is in the rest state at least 4 mm at at least a center part 26 of the corner portion 23. More specifically, the inner radius r of each of the corner portions 23 may be at least 5 mm at at least the center part 26 of the corner portion 23, possibly along the whole corner portions 23. It is to be noted that these limits for the inner radius r are valid for the interior surface 25 of the corner portions 23 along the whole length L, or substantially the whole length L, of the barrel 2. Advantageously, the invention provides that, when the teat is located within the polygonal cross-sectional shape, at the upper part 16 of the barrel, the teat fills up the inner space 21 during the whole pulsation cycles during the milking operation with the barrel being free of empty space between the teat and the interior surface 25 during the entire milking operation.

As also can be seen in FIGS. 4 and 5, each of the side portions 24-1, 24-2 of the barrel 2 is in the rest state curved inwardly towards the longitudinal axis x, preferably along the whole length L, or substantially the whole length L, of the barrel 2. Each side portion 24-1, 24-2 comprises an interior surface 27 facing the inner space 21 and having a convex curvature towards the inner space 21 with an inner radius R extending from a position P outside the inner space 21 to the interior surface 27. Both the weak side 24-1 and each strong side 24-2, in the rest state, may have the convex arcuate curvature towards the longitudinal axis x. The inner radius R of each of the side portions 24-1, 24-2 is larger than, and may be significantly larger than, the inner radius r of the corner portions 23.

The inner radius R of each of the side portions 24-1, 24-2 is in the rest state at least 20 mm and at the most 60 mm at at least a center part 28 of the side portion, or possibly at the whole side portions 24-1, 24-2, preferably at least 30 mm and at the most 50 mm, more preferably at least 35 mm and at the most 45 mm. Especially, the inner radius R of each of the side portions 24-1, 24-2 may be approximately 40 mm. It is to be noted that these limits for the inner radius R of each of the side portions 24-1, 24-2 are valid for the interior surface 27 of the side portions 24-1, 24-2 along the whole length L, or substantially the whole length L, of the barrel 2.

The border line 23-24 between the corner portion 23 and the side portion 24-1, 24-2 is located at an inner transition point in a cross-sectional plane, or inner transition line along the length L, at the interior surfaces 25, 27, where the inner radius r of the corner portion 23 is transferred to the inner radius R of the side portion 24-1, 24-2. As can be seen in FIGS. 4 and 5, there is no discontinuity at this inner transition point, where the border line 23-24 intersects the interior surfaces 25, 27. In other words, a tangent of the interior surface 25 of the corner portion 23, in said cross-sectional plane, and the tangent of the interior surface 27 of the side portion 24-1, 24-2, in said cross sectional plane, are parallel and coincide with each other at the inner transition point.

Moreover, each corner portion 23 comprises an outer surface 35 facing outwardly, away from the inner space 21 and having a convex curvature with an outer radius r' extending from the inner space 21 to the outer surface 35. Also each side portion 24-1, 24-2 comprises an outer surface 37 facing outwardly, away from the inner space 21 and having a concave curvature with an outer radius R' extending from a position P outside the inner space 21 to the outer surface 37. It is to be noted that the outer radius R' must not extend from the same position P as the inner radius R. The outer radius R' of each of the side portions 24-1, 24-2 is larger than, or significantly larger than, the outer radius r' of the corner portions 23.

The border line 23-24 between the corner portion 23 and the side portion 24-1, 24-2 is located at an outer transition point in a cross-sectional plane, or outer transition line along the length L, at the outer surfaces 35, 37, where the outer radius r' of the corner portion 23 is transferred to the outer radius R' of the side portion 24-1, 24-2. As can be seen in FIGS. 4 and 5, there is no discontinuity at this outer transition point where the border line 23-24 intersects the outer surfaces 35, 37. In other words, a tangent of the outer surface 35 of the corner portion 23, in said cross-sectional plane, and a tangent of the outer surface 37 of the side portion 24-1, 24-2, in said cross-sectional plane, are parallel and coincide with each other at the outer transition point.

In each embodiment, a first of the side portions 24-1 is a weak side and each remaining side portion 24-2 is a strong side. The weak side 24-1 has a greater flexibility than each strong side 24-2 such that during a collapse phase of the milking operation, the weak side collapses towards the longitudinal axis x before each strong side collapses and has a displacement towards the longitudinal axis x that is greater than a corresponding collapse displacement of each strong side towards the longitudinal axis x.

Figure 13:
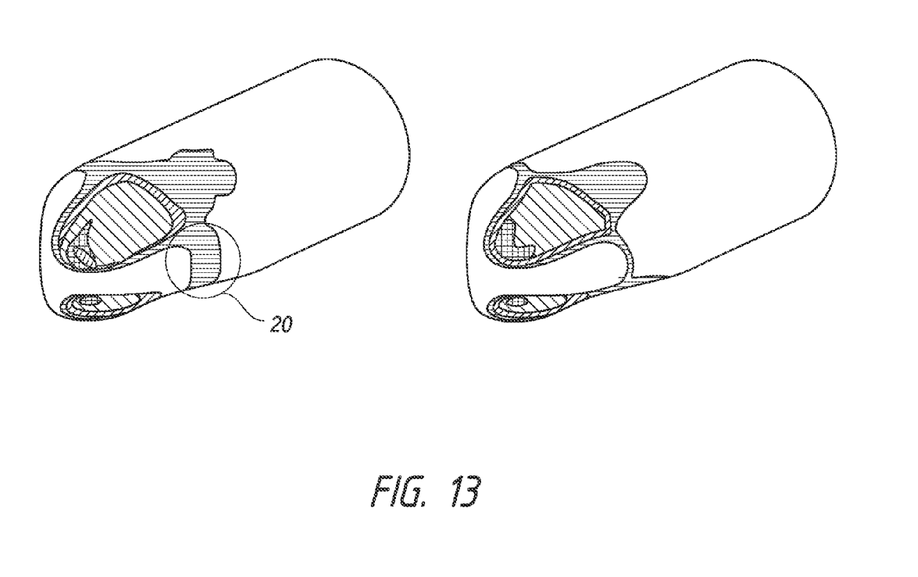
FIG. 13 illustrates the prolonged contact surface at the teat end during the collapse phase.

Advantageously, the greater displacement of the weak side creates an asymmetric pressure distribution against an end of the teat located within the barrel with a greater pressurized area against the teat end across a first surface region of the cross-sectional shape opposite the weak side as compared to a remainder of the cross-sectional shape, the region being prolonged in at least the longitudinal direction and may additionally be prolonged in the circumferential direction. This results in a prolonged contact surface extended in the longitudinal direction and/or the circumferential direction across the first region between an outer surface of the teat end and an adjacent interior surface of the teatcup liner, the increased pressurized area and the prolonged contact surface across the first surface region providing an enhanced teat massage during the collapse phase. This effect is illustrated by FIG. 13 where the left hand illustrates the prolonged contact surface 20 of the teat corresponding to the first region with the contact surface being extended in the longitudinal direction and/or the circumferential direction as compared to the right hand illustration of the contact surface located opposite a strong side 24-1.

In some preferred embodiments, the greater flexibility of the weak side is realized by the length of the weak side being greater than the corresponding length of each strong side. In other preferred embodiments, the greater flexibility of the weak side is realized by a wall thickness of the weak side being less than a corresponding wall thickness of each remaining strong side.

In preferred embodiments of each embodiment type (oval or polygon cross-section), a length Lsw, Lss of the weak side and each strong side is respectively defined as an exterior surface length of the weak side and each strong side between the two border lines 23-24 delimiting each side. An overall length OLsw, OLss of each side of the cross-section shape is defined respectively as an exterior surface length of the cross-section measured between corresponding exterior center points 29 of each two adjacent corner portions 23. In one preferred embodiment a length Lsw of the weak side is greater than the corresponding length Lss of each strong side. In this embodiment, the overall length OLSW of the weak side of the cross-section is also longer than the overlength OLSW of each strong side. Preferably, the length Lsw of the weak side is 15% to 30% greater than the corresponding length Lss of each strong side. Likewise, preferably, the overall length OLSW of the weak side of the cross-section is also 15% to 30% longer than the overlength OLSW of each strong side.

In other preferred embodiments, the greater flexibility of the weak side is realized by a wall thickness T1-1 of the weak side 24-1 is less than a corresponding wall thickness T1-2 of each remaining strong side 24-2. Preferably, the wall thickness T1-1 of the weak side is at least 15% less than the wall thickness T1-2 of each strong side, as defined by:

$$((T1\text{-}2)-(T1\text{-}1))/(T1\text{-}2)$$

where (T1-1) is the wall thickness of the weak side 24-1 and (T1-2) is the wall thickness of each strong side 24-2.

For example, where each strong side wall 24-2 thickness T1-2 is 1.7 mm and the weak side wall thickness T1-1 is less than about 1.45 mm, this relationship is satisfied.

More preferable, the wall thickness T1-1 of the weak side 24-1 should be at least 20% less than the wall thickness T1-2 of each strong side 24-2. For example, where each strong side wall thickness T1-2 is 1.7 mm and the weak side wall thickness T1-1 is less than 1.36 mm, this relationship is satisfied.

In view of factors such as an adequate liner life, the wall thickness T1-1 of the weak side 24-1 is in a range from 15% to 30% less than the wall thickness T1-2 of each strong side 24-2. For example, where each strong side wall thickness T1-2 is 1.7 mm and the weak side wall thickness T1-1 is less than 1.20 mm, this relationship is satisfied.

The wall thickness of the side portions 24-1, 24-2 may be in a range of 1 to 2.6 mm, and a wall thickness of the corner portions 23 may be in a range of 2.3 to 6 mm. More preferably, the wall thickness T1-1 of the weak side 24-1 is 1.3±0.5 mm, and the wall thickness T1-2 of each strong side 24-2 is 1.7±0.5 mm.

Figure 6:
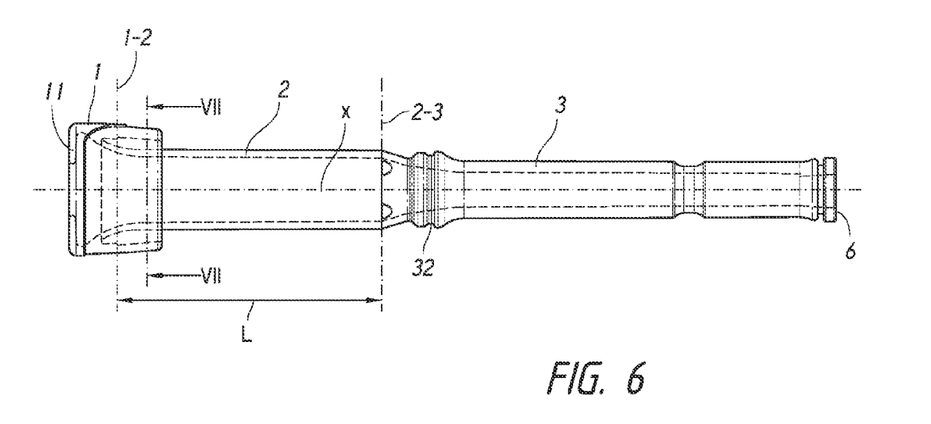
FIG. 6 discloses a longitudinal side view of a second embodiment type of a teatcup liner according to the invention.
Figure 7:
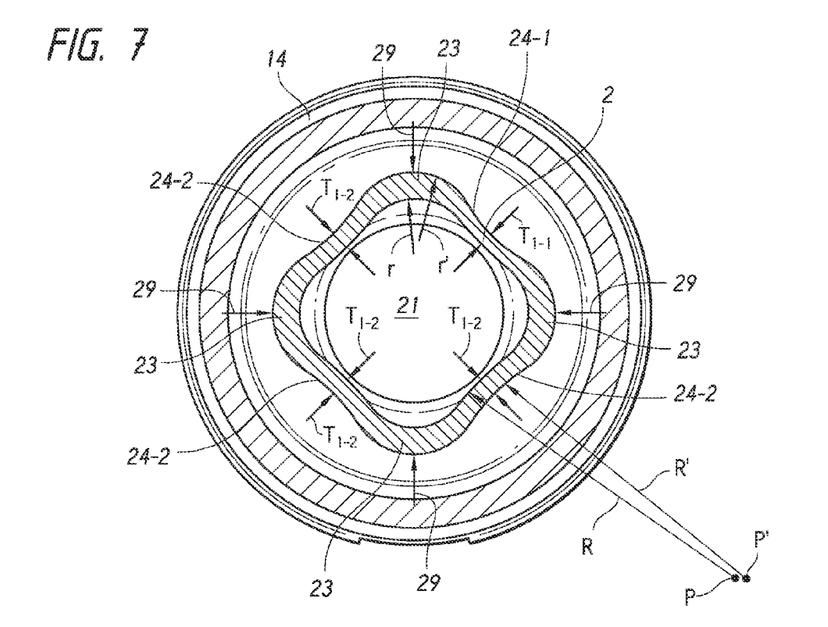
FIG. 7 discloses a sectional view of the teatcup liner along the line VII-VII in FIG. 6.

It is to be noted that the barrel 2 may have a polygonal cross-sectional shape with another number of corner portions 23 and side portions 24 than disclosed in the first embodiment type. FIGS. 6 and 7 disclose a second embodiment type, which differs from the first embodiment only in that the barrel 2 has a polygonal cross-sectional shape with only four corner portions 23 and only four side portions 24.

In the embodiments providing a polygonal cross-sectional shape, polygonal cross-sectional shapes defining only three or only four corner portions 23, and only three or only four side portions 24-1, 24-2 are preferred. More preferred is a cross-sectional shape that defines only three corner portions 23, and only three side portions 24-1, 24-2, as shown in FIGS. 3-4. However, a cross-sectional shape with five corner portions 23 and five side portions 24 (not disclosed in the drawings) may be possible.

The design of the various embodiments of the invention allows that the head 1 and the barrel 2 may each be vent-free. Additionally, the side portions 24 may be free of inner side notches and outer side ribs. Of course, ornamental features may be on the exterior surface of the liner, including the barrel.

Figure 8:
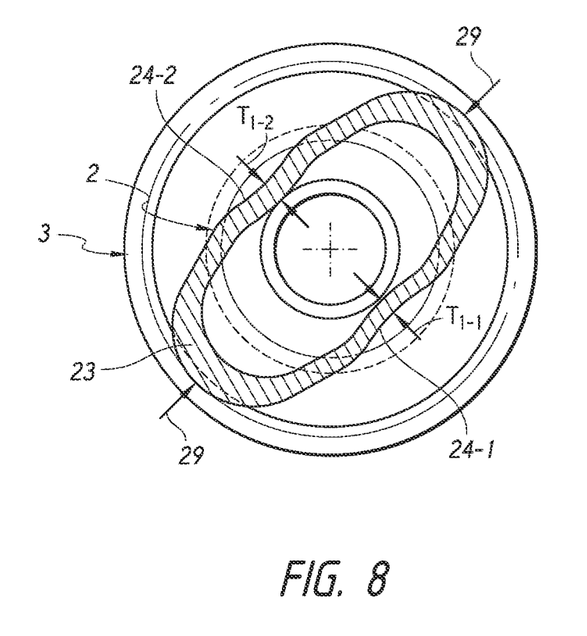
FIG. 8 discloses a third embodiment type of a teatcup liner according to the invention.
Figure 9:
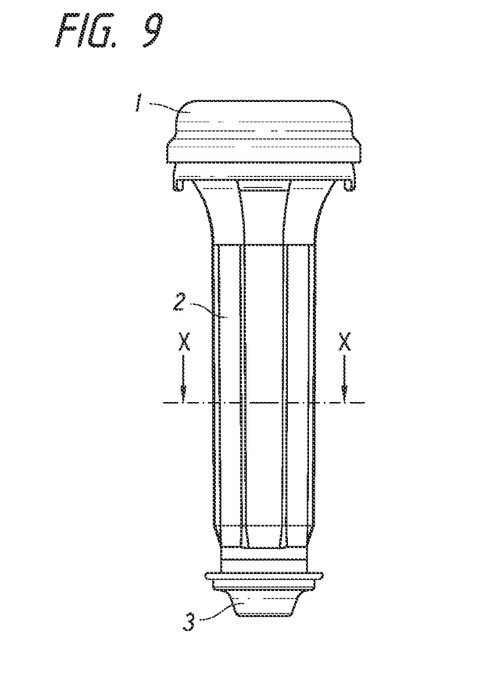
FIG. 9 discloses a longitudinal side view of a fourth embodiment type of a teatcup liner according to the invention.
Figure 10:
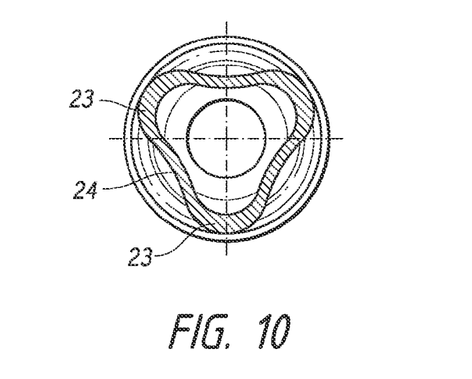
FIG. 10 discloses a sectional view of the teatcup liner along the line X-X in FIG. 9.
Figure 11:
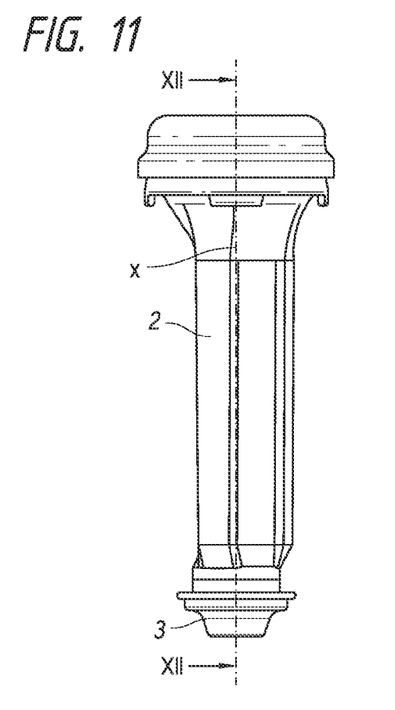
FIG. 11 discloses a another longitudinal side view of the third embodiment type of the teatcup liner in FIG. 9.
Figure 12:
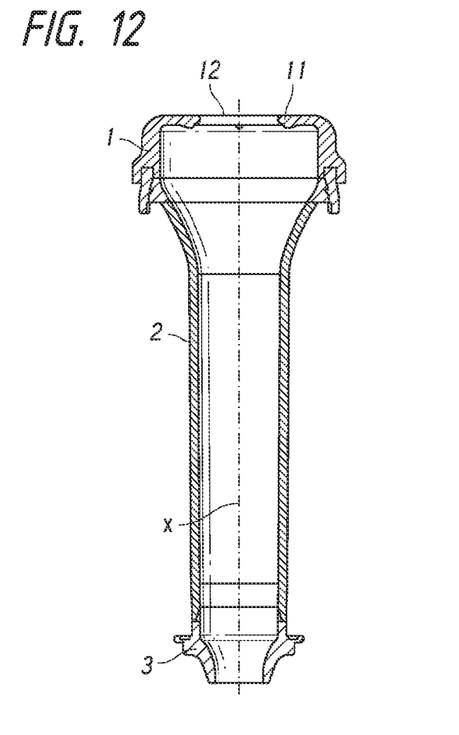
FIG. 12 discloses a sectional view of the teatcup liner along the line XII-XII in FIG. 11.

FIG. 8 illustrates a third embodiment type, i.e., the oval embodiment type, with a cross-sectional shape defined by two corner portions 23 and two side portions 24-1, 24-1. As with the polygonal cross-section embodiments, the greater flexibility of the weak side may be realized by the length Lsw of the weak side 24-1 being greater than the corresponding length Lss of the strong side 24-2 and/or by a wall thickness T1-1 of the weak side 24-1 being less than a corresponding wall thickness T1-2 of the strong side 24-2. The features the first and second embodiment types apply to the oval embodiment type. For example, in a preferred embodiment, the wall thickness T1-1 of the weak side 24-1 may be 1.3±0.5 mm and the corresponding wall thickness T1-2 of the strong side 24-2 may be 1.7±0.5 mm.

FIGS. 9-12 disclose a fourth embodiment of the teatcup liner. It is to be noted that elements having the same or corresponding functions in the embodiments disclosed above and have been given the same reference signs. In the fourth embodiment, the outlet portion 3 comprises or is designed as a nipple configured to permit connection of the outlet portion 3 and the barrel 2 to a separate short milk conduit 31 (not disclosed in FIGS. 9-12).

Furthermore, in the fourth embodiment the head 1, which comprises the lip 11 forming the opening 12 for the teat, is separate from the barrel 2. The head 1 may be permanently attached to the barrel 2 or detachably attached to the barrel 2. The barrel 2 has the same configuration as the barrel 2 in the first, second, and third embodiments with two, three, four or possibly five corner portions 23 and two, three, four or possibly five side portions 24. Such a separate head 1 permits use of different materials, or materials having different properties, e.g. with respect to the elasticity, for the barrel 2 and the head 1 or the lip 11.

It is to be noted that the outlet portion 3 of the fourth embodiment may be combined with the first, second, and third embodiments, or alternatively that the separate head portion may be combined with the first and second embodiments.

As discussed above, the teatcup liner may be used in a method of providing an enhanced teat massage during a milking operation. The method includes a first step a), of applying a teatcup to a teat of an animal, the teatcup comprising a shell 4 mounting the teatcup liner and a second step b), of applying vacuum to commence milking the animal, wherein during the collapse phase of the milking operation, the collapse of the weak side towards the longitudinal axis (x) being greater than the corresponding collapse of each strong side towards the longitudinal axis (x) creates the greater displacement of the weak side creating an asymmetric pressure distribution against an end of the teat located within the barrel with a greater pressurized area against the teat end across a first surface region of the cross-sectional shape opposite the weak side as compared to a remainder of the cross-sectional shape resulting in a prolonged contact surface across the first region between an outer surface of the teat end and an adjacent interior surface of the teatcup liner, the increased pressurized area and prolonged contact surface across the first surface region being along the longitudinal direction and/or the circumferential direction and providing an enhanced teat massage during the collapse phase.

This method is suitable in the embodiments where the greater flexibility of the weak side is provided by either of the length Lsw of the weak side 24-1 being greater than the corresponding length Lss of each strong side 24-2, and/or the wall thickness T1-1 of the weak side 24-1 being less than a corresponding wall thickness T1-2 of each remaining strong side 24-2.

The present invention is not limited to the embodiments disclosed but may be varied and modified within the scope of the following claims.

I claim:

1. A teatcup liner configured to be mounted in a shell (4) of a teatcup to be applied to a teat of an animal during a milking operation, and having a longitudinal shape extending along a central longitudinal axis (x), the teatcup liner comprising:
    a barrel (2) having a length (L) along the longitudinal axis (x) and defining an inner space (21) that receives the teat during the milking operation,
    wherein the barrel (2), along the inner space (21) that receives the teat during the milking operation, in a rest state, has a cross-sectional shape transversely to the longitudinal axis (x), the cross-sectional shape defining a plurality of corner portions (23) and a plurality of side portions (24-1, 24-2), each side portion (24-1, 24-2) connecting two of said corner portions (23),
    wherein, a first of the side portions (24-1) is a weak side and each remaining side portion (24-2) is a strong side, the weak side having a greater flexibility than each strong side such that during a collapse phase of the milking operation, the weak side collapses towards the longitudinal axis (x) before each strong side collapses and a displacement of the weak side towards the longitudinal axis (x) is greater than a corresponding collapse displacement of each strong side towards the longitudinal axis (x), the greater displacement of the weak side creating an asymmetric pressure distribution against an end of the teat located within the barrel with a greater pressurized area against the teat end across a first surface region of the cross-sectional shape opposite the weak side as compared to a remainder of the cross-sectional shape resulting in a prolonged contact surface across the first surface region between an outer surface of the teat end and an adjacent interior surface of the teatcup liner, the increased pressurized area and prolonged contact surface across the first surface region providing an enhanced teat massage during the collapse phase, and
    wherein the weak side (24-1) and each strong side (24-2), along the inner space (21) that receives the teat during the milking operation, include an interior surface and an exterior surface, and in the rest state, both the interior and exterior surfaces of the weak side (24-1) and each strong side (24-2) have an overall convex arcuate curvature towards the longitudinal axis (x).

2. The teatcup liner according to claim 1, wherein, the greater flexibility of the weak side is provided by one of the group consisting of i) a length (Lsw) of the weak side (24-1) being at least 15% longer than a corresponding length (Lss) of each strong side (24-2), and ii) a wall thickness (T1-1) at least at a center part (28) of the weak side (24-1) being less than a corresponding wall thickness (T1-2) of each remaining strong side (24-2).

3. The teatcup liner according to claim 2, wherein,
    the wall thickness (T1-1) of the weak side is at least 15% less than the wall thickness (T1-2) of each strong side, as defined by:

$((T1\text{-}2)-(T1\text{-}1))/(T1\text{-}2)$, where (T1-1) is the wall thickness of the weak side, and
    (T1-2) is the wall thickness of each strong side.

4. The teatcup liner according to claim 3, wherein,
    the wall thickness (T1-1) of the weak side is at least 20% less than the wall thickness (T1-2) of each strong side.

5. The teatcup liner according to claim 3, wherein, the cross-sectional shape defines only three corner portions (23), and only three side portions (24).

6. The teatcup liner according to claim 3, wherein, each of the corner portions (23) has a wall thickness (T2) at least at the center part (26) of the corner portion (23),
    and measured transversely to the longitudinal axis (x), each wall thickness (T1-1, T1-2) of the weak side (24-1) and each strong side (24-2) is smaller than the wall thickness (T2) of each corner portion (23).

7. The teatcup liner according to claim 6, wherein,
    each corner portion (23) comprises an interior surface (25) with an arcuate concave curvature facing the inner space (21) and having an inner radius (r) extending from the inner space (21) to the interior surface (25),
    the inner radius (r) is equal for each corner portion (23), and
    the inner radius (r) of each corner portion (23) in the rest state is at least 4 mm at a center part (26) of the corner portion (23).

8. The teatcup liner according to claim 2, wherein,
    the wall thickness (T1-1) of the weak side is in a range from 15% to 30% less than the wall thickness (T1-2) of each strong side.

9. The teatcup liner according to claim 8, wherein,
    the wall thickness (T1-2) of each strong side is 1.7±0.5 mm,
    the wall thickness (T1-1) of the weak side is 1.3±0.5 mm while also being from 15% to 30% less thick than the wall thickness (T1-2) of each strong side.

10. The teatcup liner according to claim 2, wherein,
    the wall thickness of the strong side portions (24-2) is in a range of 1 to 2.6 mm,
    a wall thickness of the corner portions (23) is in a range of 2.3 to 6 mm, and
    the wall thickness (T1-1) of the weak side is at least 15% less than the wall thickness (T1-2) of each strong side, as defined by:

$((T1\text{-}2)-(T1\text{-}1))/(T1\text{-}2)$, where (T1-1) is the wall thickness of the weak side, and
    (T1-2) is the wall thickness of each strong side.

11. The teatcup liner according to claim 2, wherein, the prolonged contact surface across the first surface region between the outer surface of the teat end and the adjacent interior surface of the teatcup liner is prolonged at least in the longitudinal direction as compared to a corresponding contact surface of an otherwise same teatcup liner having side portions of equal flexibility.

12. The teatcup liner according to claim 1, wherein the cross-sectional shape defines an oval.

13. A teatcup liner configured to be mounted in a shell (4) of a teatcup to be applied to a teat of an animal during a milking operation, and having a longitudinal shape extending along a central longitudinal axis (x), the teatcup liner comprising:
 a barrel (2) having a length (L) along the longitudinal axis (x) and defining an inner space (21) that receives the teat during the milking operation,
 wherein the barrel (2) along the inner space (21) that receives the teat during the milking operation, in a rest state, has a cross-sectional shape transversely to the longitudinal axis (x),
 the cross-sectional shape defining a plurality of corner portions (23) and a plurality of side portions (24-1, 24-2),
 each side portion (24-1, 24-2) connecting two of said corner portions (23),
 wherein, a first of the side portions (24-1) is a weak side and each remaining side portion (24-2) is a strong side,
 the weak side having a greater flexibility than each strong side such that during a collapse phase of the milking operation,
 the weak side collapses towards the longitudinal axis (x) before each strong side collapses and a displacement of the weak side towards the longitudinal axis (x) is greater than a corresponding collapse displacement of each strong side towards the longitudinal axis (x),
 the greater displacement of the weak side creating an asymmetric pressure distribution against an end of the teat located within the barrel with a greater pressurized area against the teat end across a first surface region of the cross-sectional shape opposite the weak side as compared to a remainder of the cross-sectional shape resulting in a prolonged contact surface across the first surface region between an outer surface of the teat end and an adjacent interior surface of the teatcup liner,
 the increased pressurized area and prolonged contact surface across the first surface region providing an enhanced teat massage during the collapse phase,
 wherein each corner portion (23), along the inner space (21) that receives the teat during the milking operation, comprises an interior surface (25) and an exterior surface (35) with a concave arcuate curvature facing the inner space (21),
 a wall thickness of each of the corner portions (23) is greater than a wall thickness (T1-1, T1-2) at a center part (28) of the weak side and each strong side,
 and wherein the weak side (24-1) and each strong side (24-2), along the inner space (21) that receives the teat during the milking operation, include an interior surface and an exterior surface,
 and in the rest state, both the interior and exterior surfaces have a convex arcuate curvature towards the longitudinal axis (x).

14. The teatcup liner according to claim 13, wherein,
 the cross-sectional shape defines a polygonal cross-sectional shape, and
 the polygonal cross-sectional shape defines only three or only four corner portions, and only three or only four side portions.

15. The teatcup liner according to claim 14, wherein,
 when located within the polygonal cross-sectional shape, at an upper part (16) of the barrel, the teat fills up the inner space during whole pulsation cycles during the milking operation with the barrel being free of empty space between the teat and the interior surface (25).

16. The teatcup liner according to claim 15, further comprising a head (1) connected to a top of the barrel (2), the head (1) comprising an opening (12) for the teat,
 wherein each of the side portions, in the rest state, has the convex curvature towards the longitudinal axis (x) along substantially an entirety of the length (L) of the barrel (2).

17. The teatcup liner according to claim 16, further comprising an outlet portion (3) connected to a bottom of the barrel (2),
 wherein the barrel (2) is tapered in a narrowing manner along the length (L) from the head (1) to the outlet portion (3).

18. The teatcup liner according to claim 17, wherein the head (1) and the barrel (2) are each vent-free.

19. The teatcup liner according to claim 17, wherein the side portions (24) are free of inner side notches and outer side ribs.

20. A method of providing enhanced teat massage during a milking operation, comprising:
 step a) of applying a teatcup to a teat of an animal, the teatcup comprising a shell (4) mounting a teatcup liner having a longitudinal shape extending along a longitudinal axis (x), the teatcup liner comprising:
 a barrel (2) having a length (L) along the longitudinal axis (x) and defining an inner space (21) that receives the teat during the milking operation,
 wherein the barrel (2), in a rest state, has a polygonal cross-sectional shape transversely to the longitudinal axis (x), the polygonal cross-sectional shape defining a plurality of corner portions (23) and a plurality of side portions (24), each side portion (24) connecting two of said corner portions (23),
 wherein, a first of the side portions (24) is a weak side and each remaining side portion (24) is a strong side, the weak side having a greater flexibility than each strong side such that during a collapse phase of the milking operation, the weak side collapses towards the longitudinal axis (x) before each strong side collapses and a displacement of the weak side towards the longitudinal axis (x) is greater than a corresponding collapse displacement of each strong side towards the longitudinal axis (x), and wherein the weak side (24-1) and each strong side (24-2), along the inner space (21) that receives the teat during the milking operation, include an interior surface and an exterior surface, and in the rest state, both the interior and exterior surfaces of the weak side (24-1) and each strong side (24-2) have an overall convex arcuate curvature towards the longitudinal axis (x); and
 step b) of applying vacuum to commence milking the animal, wherein during the collapse phase of the milking operation, the collapse of the weak side towards the longitudinal axis (x) being greater than the corresponding collapse of each strong side towards the longitudinal axis (x) creates the greater displacement of the weak side creating an asymmetric pressure distribution against an end of the teat located within the barrel with a greater pressurized area against the teat end across a first surface region of the cross-sectional shape opposite the weak side as compared to a remainder of the cross-sectional shape resulting in a prolonged contact surface across the first region between an outer surface of the teat end and an adjacent interior surface of the teatcup liner, the increased pressurized area and prolonged contact surface across the first surface region providing an enhanced teat massage during the collapse phase.

21. The method according to claim 20, wherein, the greater flexibility of the weak side is provided by one of the group consisting of i) a length (Lsw) of the weak side being at least 15% longer than a corresponding length (Lss) of each strong side, and ii) a wall thickness (T1-1) at least at a center part (28) of the weak side being less than a corresponding wall thickness (T1-2) of each remaining strong side.

22. The method according to claim 21, wherein, the resulting prolonged contact surface across the first region between the outer surface of the teat end and the adjacent interior surface of the teatcup liner is prolonged at least in the longitudinal direction as compared to a corresponding contact surface of an otherwise same teatcup liner having side portions of equal flexibility.

\* \* \* \* \*